(12) United States Patent
Nakamoto et al.

(10) Patent No.: US 12,319,188 B2
(45) Date of Patent: Jun. 3, 2025

(54) VEHICLE ENTRANCE STRUCTURE

(71) Applicant: TOYOTA JIDOSHA KABUSHIKI KAISHA, Aichi-ken (JP)

(72) Inventors: Tomoo Nakamoto, Toyota (JP); Noriyo Inagaki, Anjo (JP); Yukie Suzuki, Toyota (JP); Kan Hayashida, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 301 days.

(21) Appl. No.: 18/145,853

(22) Filed: Dec. 23, 2022

(65) Prior Publication Data

US 2023/0211715 A1   Jul. 6, 2023

(30) Foreign Application Priority Data

Jan. 6, 2022   (JP) .............................. 2022-000859

(51) Int. Cl.
*B60N 3/02* (2006.01)
*B62D 25/04* (2006.01)

(52) U.S. Cl.
CPC .............. *B60N 3/02* (2013.01); *B62D 25/04* (2013.01)

(58) Field of Classification Search
CPC ........... B60N 3/02; B60N 3/026; B62D 25/04
USPC .................................. 296/193.06, 1.02, 1.07
See application file for complete search history.

(56) References Cited

U.S. PATENT DOCUMENTS

| 7,972,204 B2 * | 7/2011 | Pupillo ................... B60J 10/80 296/146.7 |
| 2013/0026776 A1 * | 1/2013 | Abe ....................... B60N 3/023 296/1.02 |
| 2016/0325664 A1 | 11/2016 | López Aguado Álvarez |
| 2019/0256154 A1 | 8/2019 | Kamimura et al. |

FOREIGN PATENT DOCUMENTS

| JP | 2007-126053 A | 5/2007 |
| JP | 2013-023161 A | 2/2013 |
| JP | 2019142348 A | 8/2019 |

* cited by examiner

*Primary Examiner* — Dennis H Pedder
(74) *Attorney, Agent, or Firm* — HAUPTMAN HAM, LLP

(57) ABSTRACT

A vehicle entrance structure includes a body panel disposed in a rear part on a peripheral region of an entrance of a vehicle body, and configured to be exposed when a vehicle door is open. The body panel includes an assist surface having a predetermined area to support a hand of a user boarding or getting off of the vehicle. The assist surface is disposed at a higher level than a seat surface of an in-vehicle seat disposed beside the entrance.

6 Claims, 5 Drawing Sheets

VEHICLE ENTRANCE STRUCTURE

CROSS REFERENCE TO RELATED APPLICATION

This application claims priority to Japanese Patent Application No. 2022-000859 filed on Jan. 6, 2022, which is incorporated herein by reference in its entirety including the specification, claims, drawings, and abstract.

TECHNICAL FIELD

The present disclosure relates to a vehicle entrance structure, and more particularly to a vehicle entrance structure that facilitates users' getting on and off a vehicle.

BACKGROUND

Vehicles, such as passenger vehicles, include an entrance or a door opening on their side, and the entrance is opened and closed by a side door. The peripheral portion of the vehicle entrance is formed of a side member outer panel, for example, which externally covers a side portion of the vehicle body (see Patent Document 1, for example).

CITATION LIST

Patent Literature

[Patent Document 1] JP 2019-142348 A

SUMMARY

A vehicle includes an in-vehicle seat beside the entrance. An occupant on the seat extends his/her legs outside the vehicle to get off the vehicle. However, the user sitting on the in-vehicle seat having a seat surface located at a level higher than the ground surface may be unable to put their legs on the ground to get off, which gives users such as elderly persons with weak legs and backs difficulty in getting off the vehicle. Vehicle entrance structures that facilitate users' boarding and getting off the vehicle, including structures that reduce the burden at the time of getting off the vehicle, have therefore been desired.

An aspect of the disclosure is therefore aimed at providing a vehicle entrance structure that facilities users' boarding and getting off a vehicle.

In accordance with an aspect of the disclosure, a vehicle entrance structure includes a body panel disposed in a rear part on a peripheral region of an entrance of a vehicle body, and configured to be exposed when a vehicle door is open. The body panel includes an assist surface having a predetermined area to support a hand of a user boarding or getting off of the vehicle, and the assist surface is disposed at a higher level than a seat surface of an in-vehicle seat disposed beside the entrance.

In the vehicle entrance structure, the assist surface may include a nonslip member configured to prevent the hand of the user supported on the assist surface from slipping on the assist surface.

In the vehicle entrance structure, the assist surface may be inclined downward toward a front and outward of the vehicle.

In the vehicle entrance structure, the assist surface may be part of the body panel.

In the vehicle entrance structure, the assist surface may be part of a separate member attached to the body panel.

The disclosure enables a user to put his/her hand on the assist surface to get on and off a vehicle, thereby facilitating the user's getting on and off the vehicle.

BRIEF DESCRIPTION OF DRAWINGS

Embodiments of the present disclosure will be described by reference to the following figures, wherein.

DESCRIPTION OF EMBODIMENTS

Figure 1:
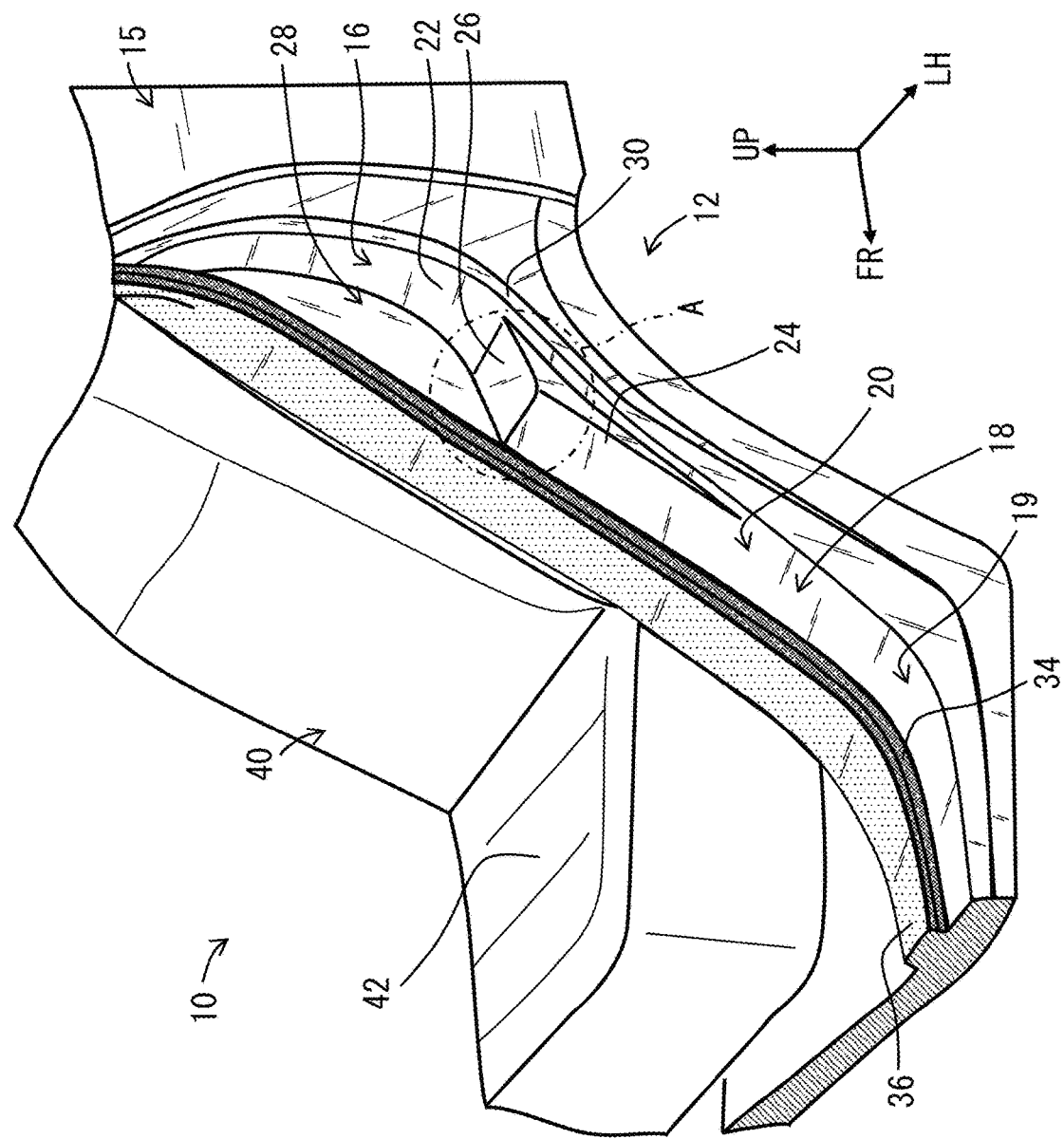
FIG. 1 is a perspective view illustrating a vehicle entrance structure according to an embodiment.

Embodiments of the present disclosure will be described by reference to the drawings. The configurations described below are explanatory examples and may be modified as appropriate in accordance with the specifications, for example, of a vehicle. It is assumed that features of a plurality of embodiments and modification examples described below are used in appropriate combinations. In all of the drawings, similar elements are designated with corresponding reference numerals and will not be described repeatedly.

In the following description, unless specifically noted, terms expressing directions and orientations, such as front, rear, left, right, upward, and downward, express those with reference to a vehicle. Further, a direction along the width of a vehicle toward the center line extending along the length of the vehicle is referred to as "inward" of the vehicle, and a direction along the width of the vehicle away from the center line is referred to as "outward" of the vehicle. In each drawing, an arrow FR indicates forward, an arrow UP indicates upward, and an arrow LH indicates leftward.

FIG. 1 is a perspective view illustrating a vehicle entrance structure 12 according to an embodiment. While in the following, the vehicle entrance structure 12 on the left of a rear seat will be described, the structure of the disclosure may be applicable to an entrance on the right of the rear seat and to an entrance structure of a vehicle driver's seat or a passenger seat.

FIG. 1 illustrates a rear seat 40 (in-vehicle seat) disposed in a vehicle 10 and an entrance 18 disposed beside the rear seat 40. The entrance 18 is a door opening that is opened and closed by a side door 14 or a vehicle door (see FIG. 4).

As illustrated in FIG. 1, an interior trim 36 is disposed adjacent to the left side of the rear seat 40 (outward of the vehicle), and a rubber gasket 34, which comes into contact with the closing side door, is further disposed on the left of the interior trim 36 (outward of the vehicle). A peripheral panel 19 or a body panel of the entrance is further disposed on the left of the rubber gasket 34 (outward of the vehicle) and is to be exposed when the side door 14 is open. The entrance structure 12 is formed of the entrance peripheral panel 19 or a body panel, which is formed of a side member outer panel 16 forming part of a vehicle body 15.

The entrance peripheral panel 19 includes a rear portion, which will be hereinafter referred to as a rear panel 20, inclined diagonally rearward and diagonally upward. The rear panel 20 includes a protruding portion 24 and a recess portion 22 adjacent to the rubber gasket 34. The protruding portion 24 is part of the rear panel 20 that is molded. The recess portion 22 is located above the protruding portion 24.

The top surface of the protruding portion 24 forms an assist surface 26 having a predetermined area on which a user would put his/her hand to board or get off the vehicle 10. The assist surface 26 assists or supports passengers' boarding or getting off the vehicle 10. The recess portion 22 includes a cavity 28 to receive an inner panel of the side door when the side door is closed.

The rear panel 20 includes a gasket contact portion 30 on the left of the protruding portion 24 and the recess portion 22 (outward of the vehicle). The rubber gasket of the side door that is closed contacts the gasket contact portion 30.

To secure the largest possible area of the assist surface 26, the protruding portion 24 has a great width from a position adjacent to the rubber gasket 34 to a position immediately before the gasket contact portion 30. The assist surface 26 faces upward of the vehicle, at a higher level than the seat surface 42 of the rear seat 40 disposed beside the entrance 18.

Figure 2:
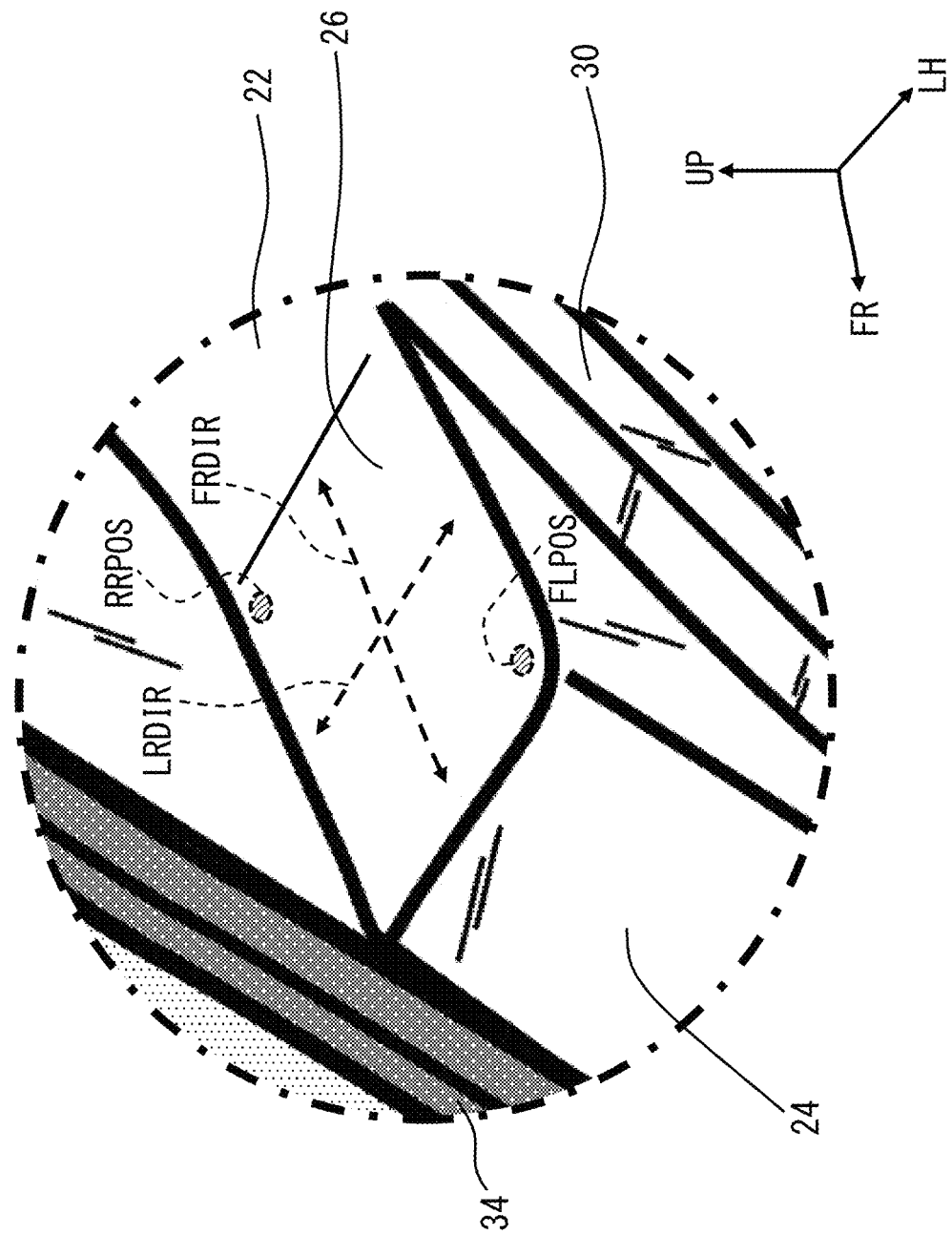
FIG. 2 is an enlarged view of portion A in FIG. 1.

FIG. 2 is an enlarged view of a portion A shown in FIG. 1. The assist surface 26 of the protruding portion 24 is a planar surface and extends in the direction FRDIR along the length of the vehicle and in the direction LRDIR along the width of the vehicle. The assist surface 26 is inclined to allow the front portion of the assist surface 26 to be lower than the rear portion of the assist surface 26 along the length FRDIR and to allow the left portion of the assist surface 26 (outward of the vehicle) to be lower than the right portion of the assist surface 26 (inward of the vehicle) along the width LRDIR. This configuration places the position RRPOS at the rear inward corner of the assist surface 26 at the highest level and places the position FLPOS at the front outward corner of the assist surface 26 at the lowest level. This configuration helps a user who puts his/her hand on the assist surface 26 and attempts to get off the vehicle 10, get out of the vehicle 10. In another embodiment, the assist surface 26 may be an uninclined surface or a surface vertical to the direction of the vehicle height, or may be a curved surface gradually descending from the position RRPOS to the position FLPOS.

Figure 3:
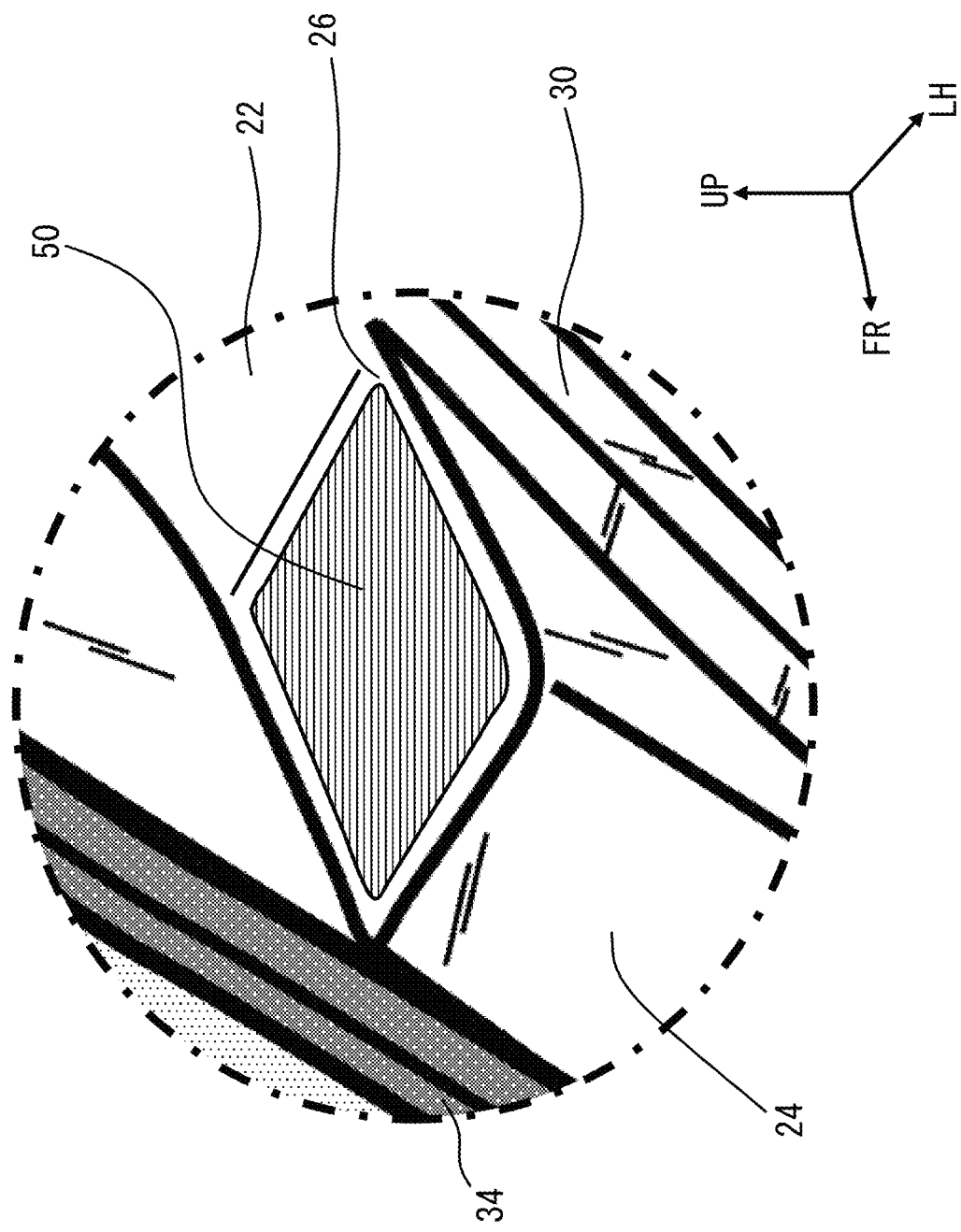
FIG. 3 illustrates an example including a nonslip member on an assist surface.

The assist surface 26 may further include a nonslip member 50 to prevent the hand of the user placed on the assist surface 26 from slipping, as illustrated in FIG. 3. The nonslip member 50 may be, for example, a flat member, such as a sticker or a resin member, having a finely uneven top surface, or a flat rubber member. The nonslip member 50 is attached to the assist surface 26 by, for example, a double-sided adhesive tape. The assist surface 26 may further include a recess portion to receive the nonslip member 50.

Figure 4:
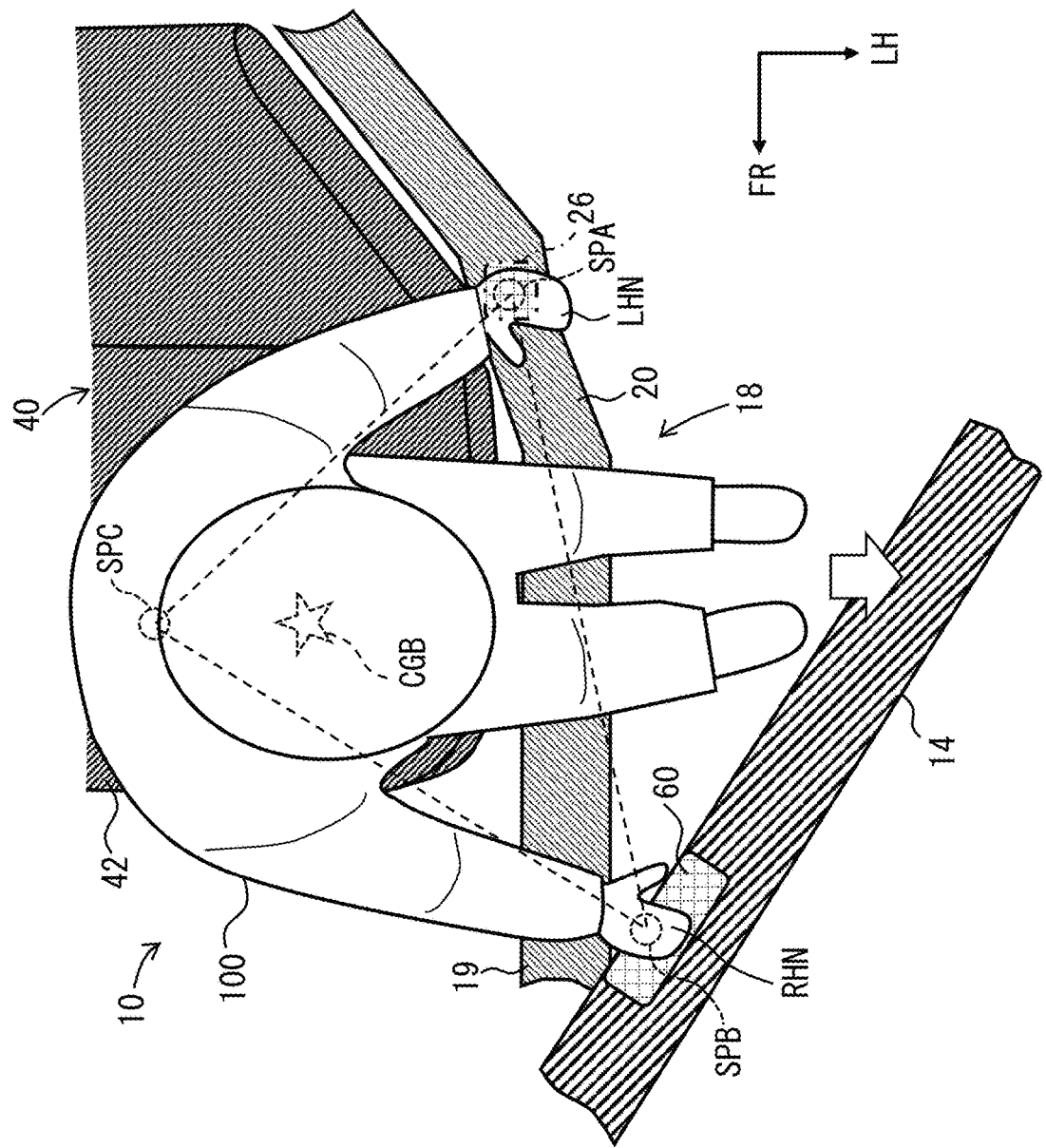
FIG. 4 is a top view of a user getting off a vehicle.

FIG. 4 is a top view of a user 100 getting off the vehicle 10. The user 100 is attempting to extend the legs outside of the vehicle 10 while remaining seated on the rear seat 40 and to get off the vehicle 10. The legs of the user 100 are not touching the ground. The side door 14 is rotatable about a door hinge (not shown) of the vehicle body disposed further frontward with respect to the rear seat 40. The side door 14 is rotated to open and close the entrance 18.

The configuration according to the embodiment described above enables the user 100 getting off the vehicle 10 to put his/her left hand LHN on the assist surface 26 of the rear panel 20, as illustrated in FIG. 4. This configuration allows the user 100 to lean his/her weight on the assist surface 26, thereby facilitating getting off of the user 100, compared to configurations without the assist surface 26.

The user 100 can further put his/her right hand REIN on a door trim 60 of the side door 14 while resting the hip on the seat surface 42 of the rear seat 40. Support points that support the user 100 therefore include SPA on the assist surface 26, SPB on the door trim 60, and SPC on the seat surface 42. These three support points SPA, SPB, and SPC are spaced from each other and can therefore support the center of gravity CGB of the weight of the user 100 with a wide range, thereby enabling the user 100 to have a stable attitude while getting off the vehicle. This provides safety and security, particularly to people with weak or disabled legs and backs.

The additional support point SPA on the assist surface 26 disposed outward of the vehicle facilitates the user's getting off the vehicle 10 when the user attempts to put the legs on the ground while remaining seated on the rear seat 40. Further, to board the vehicle 10, the user 100 can put his/her right hand REIN on the assist surface 26 of the rear panel 20, which facilitates the user's boarding the vehicle 10. The assist surface 26 further stabilizes the attitude of a passenger as compared to a structure with no assist surface, thereby mitigating the burden of passengers on their shoulders, elbows, wrists, and other body parts.

Figure 5:
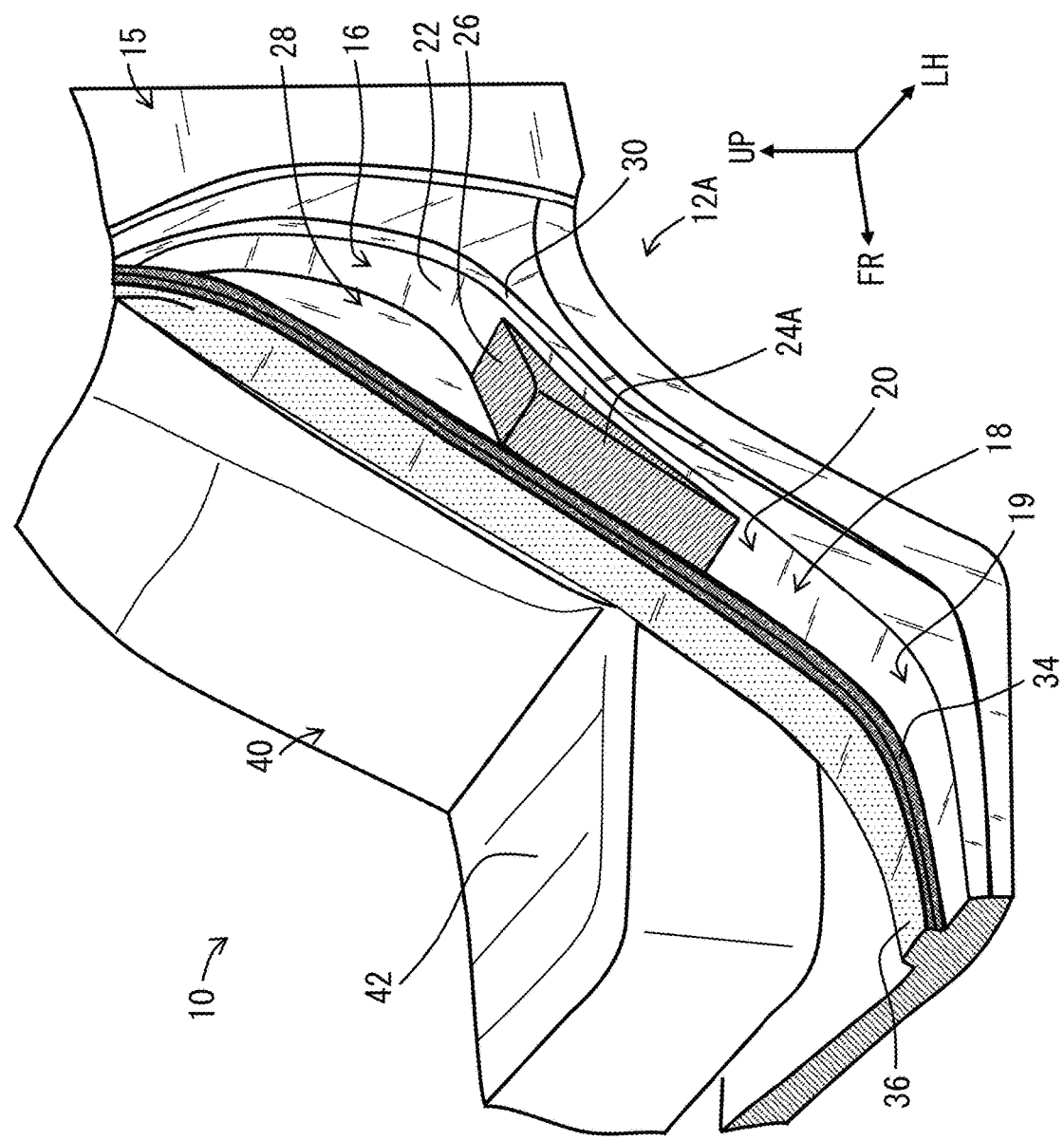
FIG. 5 is a perspective view illustrating a vehicle entrance structure according to another embodiment.

In the embodiment described above, the protruding portion 24 having the assist surface 26 is formed as part of the rear panel 20 or the side member outer panel 16 that is molded. In another embodiment, as illustrated in FIG. 5, a vehicle entrance structure 12A may include a protruding member 24A including the assist surface 26 that is attached to the rear panel 20. The protruding member 24A may be attached to the rear panel 20 by, for example, bolt clamping, rivet connection, or a double-sided adhesive tape.

The invention claimed is:

1. A vehicle entrance structure, comprising:
a body panel disposed in a rear part on a peripheral region of an entrance of a vehicle body of a vehicle, the body panel configured to be exposed when a vehicle door is open, wherein
the body panel comprises an assist surface having a predetermined area to support a hand of a user boarding or getting off of the vehicle,
the body panel further comprises:
a front panel portion extending along and in adjacent to a rubber gasket on a vehicle outward side of the rubber gasket with which the vehicle door is in contact when the vehicle door is closed, and
a group of panel portions defining an exposed space above the front panel portion when the vehicle door is open,
the group of panel portions comprises:
a step panel portion which is a first portion of the body panel, the first portion being bent from an upper end of the front panel portion rearward of the vehicle,
an upper panel portion which is a second portion of the body panel, the second portion being bent from a rear end of the step panel portion upward and rearward of the vehicle, and
a side panel portion which is a third portion of the body panel, the third portion being bent from an inner side of the step panel portion and the upper panel portion,
an upper surface of the step panel portion is configured as the assist surface, and
the assist surface is disposed at a higher level than a seat surface of an in-vehicle seat disposed in the vehicle and beside the entrance.

2. The vehicle entrance structure according to claim 1, further comprising:

a nonslip member attached on the assist surface and configured to prevent the hand of the user supported on the assist surface from slipping on the assist surface.

3. The vehicle entrance structure according to claim 1, wherein,
the assist surface is inclined downward toward a front and outward of the vehicle.

4. The vehicle entrance structure according to claim 2, wherein,
the assist surface is inclined downward toward a front and outward of the vehicle.

5. The vehicle entrance structure according to claim 1, wherein
the front panel portion, the step panel portion, the upper panel portion, and the side panel portion constitute a single piece.

6. The vehicle entrance structure according to claim 5, wherein
the front panel portion has an inclined surface extending along the rubber gasket.

\* \* \* \* \*